United States Patent [19]
Ramirez

[11] 3,969,245
[45] July 13, 1976

[54] ELECTROCOAGULATION SYSTEM FOR REMOVING POLLUTANTS FROM WASTEWATER

[75] Inventor: Ernest R. Ramirez, Lemont, Ill.

[73] Assignee: Swift & Company, Chicago, Ill.

[22] Filed: Oct. 21, 1974

[21] Appl. No.: 516,176

[52] U.S. Cl. .................. 210/44; 210/221 M; 261/121 R; 209/164
[51] Int. Cl.² ........................................ B01D 5/00
[58] Field of Search ............ 210/44, 199, 220, 221, 210/221 M, 221 P; 261/122, 121 R, DIG. 75; 209/162, 164, 166, 170

[56] References Cited
UNITED STATES PATENTS

| | | | |
|---|---|---|---|
| 2,695,710 | 11/1954 | Gibbs | 210/44 |
| 3,301,779 | 1/1967 | Kovacs | 210/44 |
| 3,397,140 | 8/1968 | Dea | 210/44 |
| 3,444,076 | 5/1969 | Sekikawa | 210/221 P |
| 3,479,281 | 11/1969 | Kikindai | 204/149 |
| 3,505,188 | 4/1970 | Pei-Tai Pan | 210/221 |
| 3,525,437 | 8/1970 | Kaeding | 210/221 |
| 3,552,571 | 1/1971 | Neuspiel | 210/221 |
| 3,725,264 | 4/1973 | Wheeler | 210/221 P |
| 3,726,780 | 4/1973 | Harnden et al. | 210/221 |
| 3,769,207 | 10/1973 | Baer | 209/170 |
| 3,775,307 | 11/1973 | McWherter et al. | 210/220 |
| 3,793,174 | 2/1974 | Ichiki et al. | 210/44 |
| 3,793,178 | 2/1974 | Austin | 210/221 |
| 3,816,274 | 6/1974 | Anderson | 210/44 |
| 3,817,865 | 6/1974 | Austin | 210/44 |
| R26,449 | 9/1968 | Bradt | 210/44 |

*Primary Examiner*—Thomas G. Wyse
*Assistant Examiner*—Ernest G. Therkorn
*Attorney, Agent, or Firm*—Edward T. McCabe; Charles E. Bouton; Raymond M. Mehler

[57] ABSTRACT

Wastewater is treated by a method and an apparatus in which a wastewater flow passes through an electrocoagulation cell having rod-shaped electrodes longitudinally disposed therein. The electrodes are oriented in one or more circles or portions of circles. The wastewater flow remains within the cell for about 1/10 minute to 2 minutes, during which time pollutants within the wastewater are turbulently mixed and combined with bubbles produced at the electrodes, thereby forming an embryo floc. The embryo floc flows out of the cell with the treated wastewater from the top portion of the downstream end of the cell, after which it may be treated with a flocculant to form a full floc. The full floc and thus clarified wastewater flow into a flotation basin where the full floc undergoes a laminar flow to the top of the clarified wastewater and is skimmed off.

11 Claims, 3 Drawing Figures

ELECTROCOAGULATION SYSTEM FOR REMOVING POLLUTANTS FROM WASTEWATER

This invention relates to a method and a means of removing pollutants from raw wastewaters by rapidly flowing same through a zone of very fine bubbles which are electrolytically generated within a cylindrical cell which has a plurality of electrodes arranged longitudinally within the cell in one or more concentric circles or portions thereof. The thus processed wastewater then flows into a tank for separation of the treated, buoyant pollutants from the clarified wastewater.

In various fields of industry, processes are practiced in which there are generated raw wastewaters that contain pollutants such as suspended oils, fats, proteins, fillers, glycerides, fibers and biodegradable materials, and emulsified fats, oils, and the like. Various pollution problems are brought about when such suspended and emulsified particles are permitted to enter into bodies of water or enter untreated into sewer systems and the like. In order to lessen such pollution problems, raw wastewaters are processed in a variety of manners.

Prior art techniques indicate that a relative degree of success in purifying such wastewaters can be achieved by passing bubbles of gases through a large tank containing industrial wastewater, whereby rising gas bubbles, having a laminar flow through the tank, occlude or become attached to some of the particulate matter. The thus treated particles tend to be less dense than water and accordingly rise to near the surface of the liquid within the tank where they can be skimmed off. Often these processes are combined with various chemical treatments. Even then, such prior art techniques are time consuming and relatively inefficient. Generally, prior art methods and apparatus cannot economically treat wastewater as quickly as it is generated in a large scale industrial process so as to satisfactorily remove pollutants therein.

As described in my co-pending U.S. Patent application Ser. No. 441,673, improved results can be obtained by first forming an embryo floc, hereinafter defined, which may then be treated with a flocculant to form a full floc, hereinafter defined, which is very buoyant and separates from the wastewater. It has now been determined that even further improved results can be obtained with the present method and apparatus wherein the embryo floc is formed when wastewater flows through a dense zone of bubbles formed by the convergence of fine bubbles produced along a plurality of electrodes arranged longitudinally in a cylindrical cage through which the wastewater flows.

It is therefore an object of the present invention to provide a method and means for electrolytically generating large quantities of gas bubbles along a right cylindrical cage of electrodes within a cell and simultaneously rapidly flowing a wastewater through the cylindrical cage, to develop a turbulence and form a floc, thereafter permitting the floc to float within and be removed from near the surface of a separate flotation tank.

Another object is to provide a method and a means for generating an embryo floc through the efficient formation of a zone of very fine bubbles which suround and combine with pollutants within wastewater as it rapidly and turbulently flows through a cylindrical cell having its axis lying substantially horizontally.

The present invention is an improved method and means for treating a wastewater flow which includes introducing the wastewater at one end of a cylindrical cell, rapidly flowing same through a cylindrical cage of a plurality of electrodes positioned longitudinally within the cell in one or more circles or portions of circles that are concentric with each other and with the cylindrical cell, said electrodes generating a dense zone of fine bubbles which combine with pollutants within the wastewater under turbulent conditions to form an embryo floc. The embryo floc and wastewater flow out of the cell and a full floc is permitted to form and then is flowed into a basin wherein the full floc is skimmed from the surface of the wastewater.

Additional objects, if not set forth specifically herein, will be readily apparent to those skilled in the art from the detailed description of the invention which follows and from the drawings in which.

Figure 1:
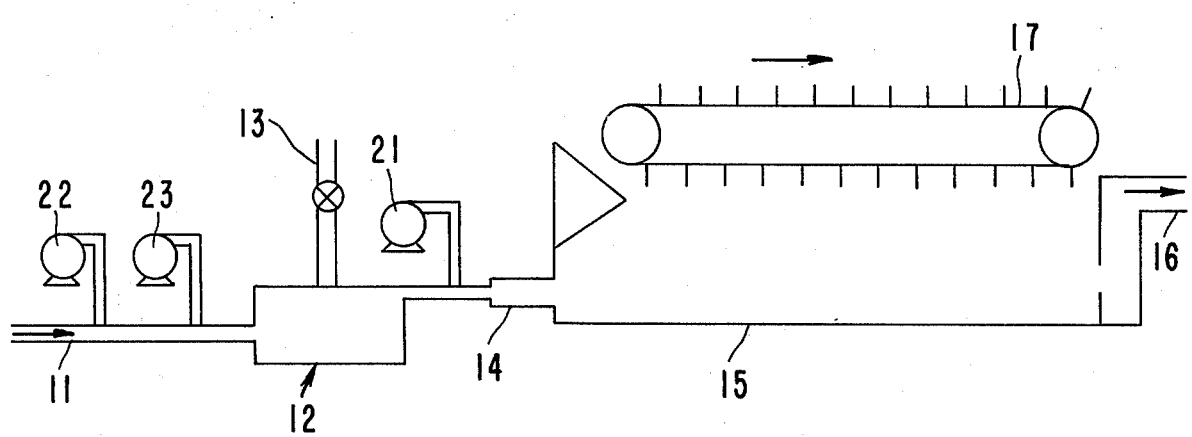
FIG. 1 is a schematic illustration of the present invention.

The first essential step of the method of the present invention is the passing of a flow of raw industrial or municipal wastewater through an electrocoagulation cell for a brief period of time during which pollutants and fine bubbles are combined to form an embryo floc, which process is generally assisted by the hydrophobic nature of most pollutants. As used herein, an "embryo floc" refers to those aggregates formed by the interaction among solid and liquid colloidal pollutants, the fine bubbles, and a coagulant (if used as discussed hereinafter), which formation occurs within the electrocoagulation cell. An embryo floc as used herein generally consists of about $10^5$ to $10^6$ of the aggregates of bubbles and pollutants per liter of treated wastewater. The cell itself has a right cylindrical shape and contains a plurality of electrodes disposed longitudinally therein to form a cage like structure of one or more circles or portions thereof which are concentric with each other and with the axis of the cell. Water enters the cell at one end, flows primarily through the entire electrode cage, and then out of the other end of the cell, preferably near the top thereof.

During the time that the wastewater is within the cell, it is subjected to a turbulent condition created by the interaction of the flowing wastewater and the bubbles that are electrolytically produced at the electrodes which substantially surround the flow of wastewater within the cell. This turbulence significantly increases the number of contacts made between the bubbles and the pollutants, although each pollutant particle is within the cell for an average time of only about one-tenth minute to 2 minutes, preferably about 1 minute. Maintaining a turbulence within the cell is aided by the density of bubbles formed at the electrodes, there being $10^4$ to $10^{10}$ bubbles per liter, preferably greater than $10^6$ bubbles per liter. The bubble size is on the order of 10 to 500 microns in diameter, preferably 10 to 100 microns. The density and size of the bubbles are such that they fill approximately 0.1 to 10 volume percent of the volume of the wastewater being treated, preferably 0.3 to 2 volume percent. The specific relationships between the parameters of bubble size, density, current flow between the electrodes, and the like, which are exhibited by the present invention are discussed more fully in said co-pending U.S. patent application Ser. No. 441,673, as well as in the co-pending U.S. patent application of Ramirez and Johnson entitled "Apparatus and Method for Removing Pollutants from Wastewater."

After the embryo floc has been formed under the turbulence achieved within the cell, it flows through a transfer conduit during which time all or some of the embryo floc may further combine to form a full floc having a density of about 0.7 to 0.9. As used herein, the term "full floc" includes a relatively large number of fine bubbles, conglomerates of pollutants, some coagulant (if used), and a flocculant (if added, as mentioned herein). The full floc has a relatively compact structure, and its low apparent density provides it with substantial buoyancy in water. The transfer conduit connects the electrocoagulation cell to a large tank or flotation basin, wherein the already formed full floc, under conditions of laminar flow, rises to near the surface of the thus clarified wastewater, whereupon it is skimmed off and kept separated from the clarified wastewater which flows out of the downstream end of the flotation basin.

A preferred, but not an essential method step is the injection of a flocculant into the transfer conduit to promote the formation of a full floc by further combining the embryo floc aggregates of bubbles and pollutants. Such flocculant addition is of particular importance for use with wastewaters that are characterized as having emulsive properties. Flocculants are particularly useful in completing the breaking of such emulsions to thereby induce the formation of the full floc. Flocculants suitable for use in the aforementioned co-pending U.S. patent applications are likewise suitable in the present invention and include polyacrylic acrylamides, copolymers of from about 50 to 90 weight percent acrylamides or methacrylamides, and from about 10 to 50 weight percent acrylic or methacrylic acid or water soluble salts thereof. These polymers are characterized by a weight average molecular weight of about 2 million and usually within the range of about 7 to 12 million as measured by light scattering techniques. Such polymers are known in the art and are available from several commercial sources. When a flocculant is added at this stage of the method, it is added at a concentration within the approximate range of about one-half to 15 ppm.

An optional step of the present method is the treatment of the raw wastewater with a coagulant before it enters the electrocoagulation cell. Such will assist in the initial breaking of emulsions within many wastewaters. As discussed in the previously mentioned co-pending application of Ramirez and Johnson, raw wastewaters contain approximately $10^8$ to $10^9$ pollutant particles per liter of wastewater. Generally, the addition of a coagulant before it enters the electrocoagulation cell will, by combining some of the particles, reduce the number thereof roughly by a factor of 10, to about $10^7$ to $10^8$ per liter. Suitable coagulants include aluminum sulfate, alum, ferric sulfate, ferric chloride, lime, and the like.

One other optional method step is the adjusting of the pH of the wastewater. Such step may be needed to bring the pH of the finally clarified wastewater to within standards set by municipalities and other government bodies. For example, an added coagulant may result in a pH reduction that will call for the addition of a compound such as calcium hydroxide. It has been found to be convenient to add such a compound before the wastewater enters the electrocoagulation cell.

FIG. 1 illustrates the present apparatus. Influx conduit 11 directs the flow of raw wastewater into the electrocoagulation cell, indicated generally by reference numeral 12. The cell 12 includes a gas vent 13 along the top thereof and is in communication with a transfer conduit 14. The other end of transfer conduit 14 is in communication with large tank or flotation basin 15, the downstream end thereof having a clarified wastewater efflux conduit 16. Positioned along the top of flotation basin 15 is a skimming means 17 for conveying the full floc from the surface of the basin 15 for disposal, storage, or further treatment. Skimming means 17 preferably is directed such that the full floc leaves basin 15 from its end opposite that in communication with efflux conduit 16.

The preferred, but not essential, flocculant injector 21 is shown in communication with transfer conduit 14. Optional coagulant injector 22 and injector 23 for adding a compound to adjust the pH of the wastewater are shown in communication with influx conduit 11.

Figure 3:
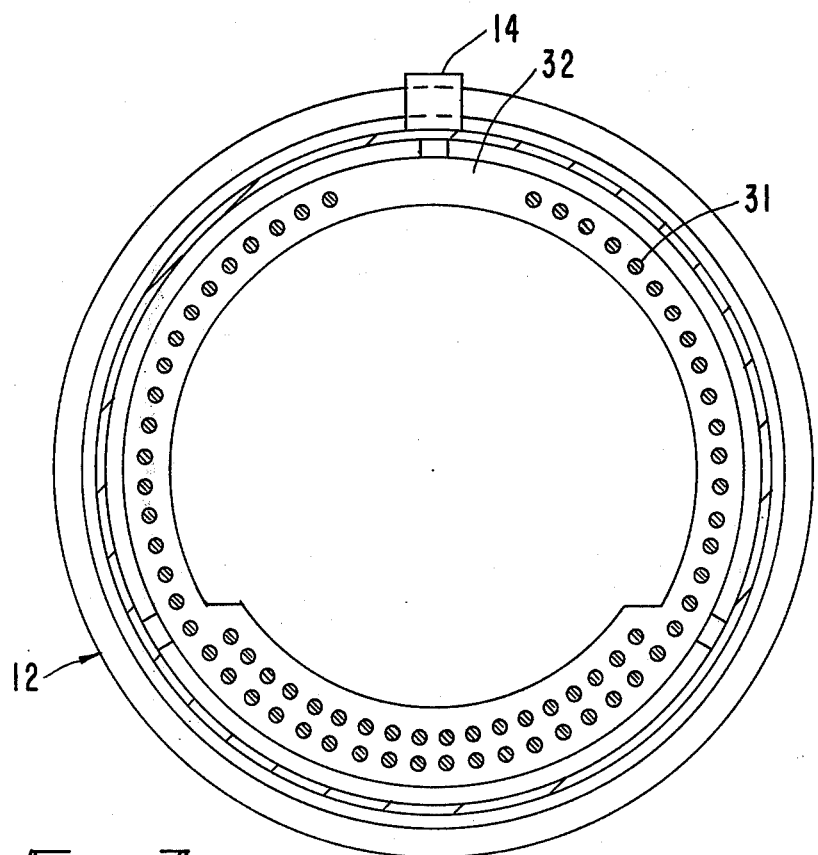
FIG. 3 is a cross-section through the line 3—3 of FIG. 2.
Figure 2:
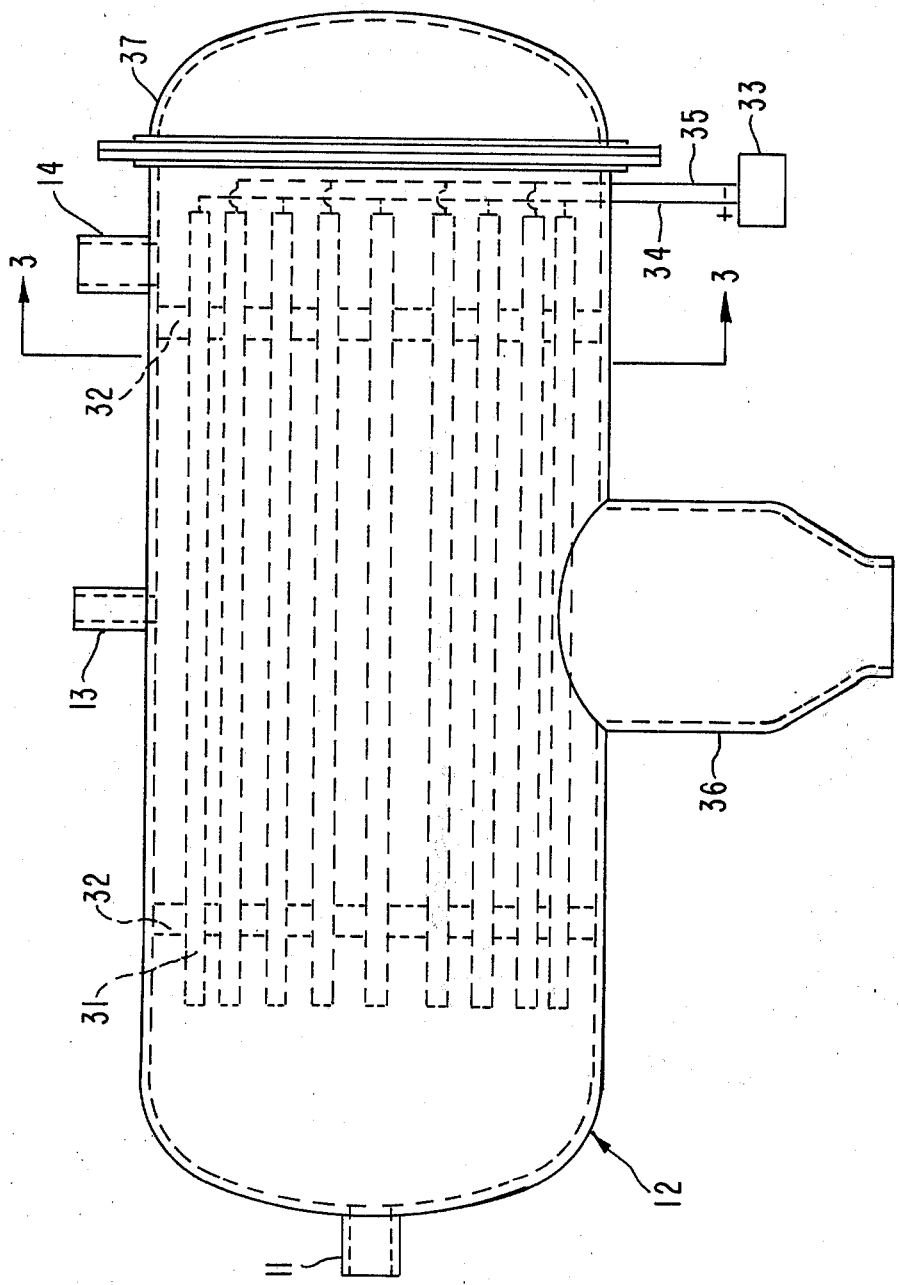
FIG. 2 is an elevation view of a portion of the preferred apparatus.

FIGS. 2 and 3 illustrate a preferred embodiment of the electrocoagulation cell 12. In FIG. 2, electrodes 31 have been increased in diameter for clarity and several electrodes have been omitted, also for clarity. The electrodes 31 are positioned within cell 12 by means of at least two mounting members 32.

Alternate electrodes 31 are connected in series to one of two terminals of a power source 33, which may be a DC battery or a rectified AC power source. Such electrical connections are made by wires 34 and 35, or the like.

Large conduit 36 in communication with the bottom of cell 12 is an optional feature of this embodiment which may provide for a recirculation of wastewater back to the source of raw wastewater in the event that the wastewater flow is so large as to exceed the capacity of the particular cell 12. Another optional feature of the apparatus is flanged cover 37 which is provided for the purpose of facilitating any cleaning of the cell 12 and removal or repair of the electrodes and the like.

In FIG. 3, it can be seen that the preferred embodiment includes one grouping of electrodes 31 that is substantially a complete circle, with a few electrodes omitted from the top of the circle to allow for ease of passage of the embryo floc to the top downstream portion of cell 12 and flow thereof through transfer conduit 14. Another grouping of electrodes 31 in the preferred embodiment takes the form of a portion of a circle which is concentric with the other circular grouping of electrodes 31 and also with the cell 12. Of course, the electrodes 31 can be arranged in any number of ways other than this specific grouping of electrodes.

The following examples are set forth as illustrative embodiments of the present invention and are not to be taken in any manner as limiting the scope of the invention which is defined by the appended claims.

EXAMPLE I

An electrocoagulation cell as depicted in FIGS. 2 and 3, containing a total of 80 electrodes having a diameter of 2-3/16 inches and a surface-to-surface spacing therebetween of three-fourths inch, was utilized in this Example. The amperage density produced at the electrodes was about 12 amperes per square foot, the total amperage generated being 2,000 amps. The electrodes were constructed of rods of Duriron, a ferrosilicon alloy, and were suspended by two wooden mounting members. The cell itself had a diameter of 5 feet and was able to successfully treat an industrial wastewater flow of 800 gallons per minute in forming an embryo floc. The polymer flocculant described herein was added to form a full floc which was passed into a flotation basin for skimming from the surface of the wastewater.

EXAMPLE II

In a pilot arrangement of the present apparatus, four electrodes made of Duriron were grouped in a single circular fashion. Each electrode was 5 feet long and 1½ inches in diameter. The tank was 6 feet 6 inches long and was designed for a flow rate of only 10 gallons per minute but exhibited the ability to easily handle up to 18 gallons per minute. A total of 42 amperes of current was generated by a 9 volt power source. A ferrifloc coagulant was added in the amount of 1,100 ppm, along with 850 ppm of calcium hydroxide to a wastewater flow from a leather treatment plant. Such water flowed through the electrocoagulation cell, after which 12 ppm of an anionic polymer flocculant such as those described herein was then added, after which the treated wastewater entered a flotation basin. The raw wastewater contained 1,100 ppm BOD (biochemical oxygen demand), 220 ppm fats and oils, and 680 ppm suspended solids. The treated wastewater was found to contain 260 ppm BOD, 18 ppm fats and oils, and 130 ppm suspended solids. Thus, the BOD content was reduced by 77%, the fats and oils content by 92%, and the suspended solids content by 80%. Also, close inspection of the apparatus after several days of operation showed substantially no settled floc at the bottom thereof, indicating the superior lifting power of the electrocoagulation cell. The cell itself required little or no attention throughout this period.

Obviously, many modifications and variations of the invention as hereinbefore set forth may be made without departing from the spirit and scope thereof, and only such limitations should be imposed as are indicated in the appended claims.

I claim:

1. A method for removing pollutants from raw wastewater comprising the steps of: providing a bubble supply produced electrolytically by decomposing a flow of wastewater; positioning said bubble supply as a cylindrically shaped dense zone of fine bubbles, said positioning being longitudinal along the flow of wastewater; rapidly flowing said wastewater through said dense zone of fine bubbles; simultaneously turbulently contacting said fine bubbles with pollutants within said wastewater while said wastewater flows through said zone, thereby forming a buoyant embryo floc within said wastewater, said embryo floc remaining unseparated from said flow of wastewater; venting said zone to atmosphere to prevent pressure buildup within said zone; then removing said unseparated flow of wastewater and embryo floc out of said dense zone of fine bubbles whereby some of said buoyant embryo floc is combined into a buoyant full floc; introducing said full floc and wastewater into a downstream flotation basin without realizing any appreciable pressure differential, whereby the buoyant full floc rises to near the surface of the wastewater in a manner approximating a laminar flow; and then clarifying the wastewater by separating the full floc from the wastewater, said clarifying step being the initial removal of floc from the flow of wastewater.

2. The method of claim 1, wherein said step of rapidly flowing the wastewater is accomplished in about one-tenth minute to 2 minutes.

3. The method of claim 1, wherein said dense zone of fine bubbles fills about 0.1 to 10 volume percent of the wastewater flow and contains about $10^4$ to $10^{10}$ bubbles per liter of wastewater, and said fine bubbles are within a size range of about 10 to 500 microns in diameter.

4. The method of claim 1, wherein said step of rapidly flowing wastewater initially directs said wastewater flow along the axis of said cylindrically shaped bubble supply, and said flow of embryo floc from said dense zone of fine bubbles is from near the downstream, top portion of said cylindrically shaped bubble supply.

5. The method of claim 1, wherein said full floc has a density within the range of about 0.7 to 0.9.

6. The method of claim 1, wherein said step of combining the embryo floc to form the full floc is assisted by injecting a flocculant into the unseparated flow of embryo floc and wastewater after it flows from said dense zone of fine bubbles.

7. The method of claim 6, wherein said flocculant is a polyelectrolyte added at a concentration within the range of about one-half to 15 ppm.

8. An apparatus for removing pollutants from raw wastewater comprising: a cylindrical electrocoagulation cell having an approximately horizontal axis; a vent to atmosphere on said cell; a plurality of elongated electrodes positioned longitudinally within the cell in one or more circles or portions of circles concentric to each other and to said axis; a wastewater influx conduit in communication with one end of said cell; a transfer conduit, said transfer conduit being in communication with the other end of said cell, said transfer conduit being in communication with the top portion of the cell, and said transfer conduit being the only means for removing treated wastewater and buoyant flocs formed in said cell from said cell; a downstream flotation basin in communication with said transfer conduit, said communication from the transfer conduit into the flotation basin being one across which there is substantially no pressure differential; and a means associated with said flotation basin for initially removing said flocs from the thus clarified wastewater.

9. The apparatus of claim 8, further comprising a flocculant injector in communication with said transfer conduit.

10. The apparatus of claim 8, further comprising a coagulant injector in communication with said influx conduit.

11. The apparatus of claim 8, further comprising an injector for adding a compound to adjust the pH of the wastewater, said injector being in communication with said influx conduit.

* * * * *